United States Patent Office 3,531,483
Patented Sept. 29, 1970

3,531,483
HYDROXYPHENYLALKYLENEYL
ISOCYANURATES
Jack C. Gilles, Shaker Heights, Ohio, assignor to The B. F. Goodrich Company, New York, N.Y., a corporation of New York
No Drawing. Filed Oct. 25, 1968, Ser. No. 770,863
Int. Cl. C07d 55/38
U.S. Cl. 260—248          14 Claims

ABSTRACT OF THE DISCLOSURE

Novel hydroxyphenylalkyleneyl isocyanurates have been prepared. These compounds stabilize organic materials against the deleterious effects of oxygen, heat and light. The stability of α-monoolefin homopolymers and copolymers is particularly enhanced by incorporating stabilizing amounts of the hydroxybenzyl isocyanurates therein.

BACKGROUND OF THE INVENTION

Esters of cyanuric acid and isocyanuric acid, wherein the ester substituent is an aliphatic hydrocarbon radical containing up to about 8 carbon atoms, are known. Tris-(2-hydroxyalkyl)isocyanurates have also been prepared, however, the process employed for their preparation, the reaction of isocyanuric acid and an alkylene oxide, is not suitable for providing hydroxyaryl (phenolic) isocyanurates. Aryl isocyanurates have heretofore been limited to the functionally unsubstituted benzyl isocyanurates.

SUMMARY OF THE INVENTION

I have now prepared aryl isocyanurates wherein the aryl substituent is functionally substituted with a hydroxyl group. More particularly, the present invention relates to novel phenolic etsers of isocyanuric acid, for example, to hydroxyphenylalkyleneyl isocyanurates such as 4-hydoxybenzyl isocyanurates. The isocyanurate ring may be substitued with one, two or three hydroxyphenylalkyleneyl groups. The hydroxyphenylalkyleneyl radicals are alkyl substituted, that is, they contain one or more alkyl radicals on the aromatic nucleus. It is essential for the compounds of the present invention that the position immediately adjacent to the hydroxyl group be substituted with an alkyl group. Preferred compounds of the present invention will have the hydroxyl group hindered with a tertiary alkyl group.

The present phenolic esters of isocyanuric acid are useful stabilizers for a wide variety of organic materials. They possess low volatility, are nonstaining and are extremely effective protective agents for organic polymeric materials, both natural and synthetic, which are subject to the deleterious effects of oxygen, heat and visible or ultraviolet light. They are especially useful as stabilizers for α-monoolefin homopolymers and copolymers, particularly, polyethylene, polypropylene, ethylene-propylene copolymer and ethylene-propylene terpolymers.

DETAILED DESCRIPTION

The compounds of the present invention are represented by the general formula

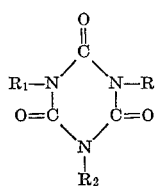

wherein R is a hydroxyphenylalkyleneyl radical having the formula

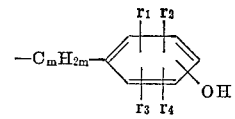

wherein $m$ is an integer from 1 to 4, $r_1$ is an alkyl group, either aliphatic or cycloaliphatic, containing from 1 to 18 carbon atoms and positioned immediately adjacent to the hydroxyl group on the ring, and $r_2$, $r_3$ and $r_4$ are hydrogen or an aliphatic or cycloaliphatic group containing from 1 to 18 carbon atoms; and $R_1$ and $R_2$ are hydrogen or the same as R above. Especially useful isocyanuric acid esters are those compounds wherein two, and more preferably all, of the R groups are hydroxyphenylalkyleneyl radicals wherein $r_1$ is a t-alkyl group containing from 4 to 12 carbon atoms, $r_2$ is an alkyl group containing from 1 to 12 carbon atoms, $r_3$ and $r_4$ are hydrogen and $m$ is 1, such as the 3,5-di-t-butyl-4-hydroxybenzyl radical, 3-methyl-5-t-butyl-4-hydroxybenzyl radical, 2-methyl-5-t-butyl-4-hydroxybenzyl radical, 3-t-butyl-5-methyl-2-hydroxybenzyl radical or like radicals.

The present invention encompasses the symmetrical tris - (3,5-di-t-alkyl-4-hydroxybenzyl)isocyanurates which are a preferred class of compounds and which may be represented structurally by the formula

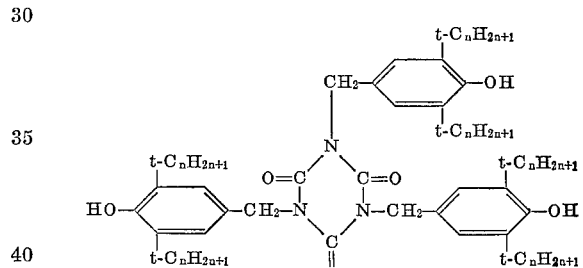

where $n$ is an integer from 4 to 8. These compounds are excellent stabilizers for organic materials which are subject to oxidative, thermal and ultraviolet degradation, such as for example, natural rubber and olefin homopolymers and copolymers. They possess a good balance of properties useful for many stabilizing applications. It is most significant with these tris-(3,5-di-t-alkyl-4-hydroxybenzyl)isocyanurates that although they are high molecular weight, a necessary requirement if low volatility is to be achieved, the concentration of the hindered phenol grouping has nevertheless been maintained at a high level (3 hindered phenol groups/molecule). This permits lower levels of stabilizer to be employed which results in a considerable economic advantage for the user.

Typical of the 4-hydroxybenzyl isocyanurates within the scope of the present invention are: tris-(3-methyl-4-hydroxybenzyl)isocyanurate, tris - (3-t-butyl-4-hydroxybenzyl)isocyanurate, tris - (3-t-amyl-4-hydroxybenzyl) isocyanurate, tris-(3-octyl-4-hydroxybenzyl)isocyanurate, tris-(3,5-dimethyl-4-hydroxybenzyl)isocyanurate, tris-(3, 5-diisopropyl - 4 - hydroxy - benzyl)isocyanurate, tris-(3-methyl-5-isobornyl-4-hydroxybenzyl)isocyanurate, tris-(3-cyclohexyl-4-hydroxybenzyl)isocyanurate, tris - (3,5-di-t-butyl-4-hydroxybenzyl)isocyanurate, tris - 3 - t-butyl-5-t-amyl-4-hydroxybenzyl)isocyanurate, tris - (3,5-di-t-amyl-4-hydroxybenzyl)isocyanurate, tris-[3,5-di-(1 - methyl-1-ethylpropyl)-4-hydroxybenzyl]isocyanurate, tris-[3,5 - di-(1,1,2,2 - tetramethylpropyl)-4-hydroxybenzyl]isocyanurate, tris-[3,5-di-(1-dimethylpentyl)-4-hydroxybenzyl]isocyanurate, bis-(3-methyl-4 - hydroxybenzyl)isocyanurate, bis-(3-t-butyl - 4 - hydroxybenzyl)isocyanurate, bis-(3,5-dimethyl-4-hydroxy - benzyl)isocyanurate, bis-(3,5-di-t-butyl - 4 - hydroxybenzyl)isocyanurate, 3-methyl-4-hydroxybenzyl isocyanurate, 3-t-butyl - 4 - hydroxybenzyl isocyanurate, 3,5-dimethyl - 4 - hydroxybenzyl isocyanurate, 3,5-di-t-butyl-4-hydroxybenzyl isocyanurate and the like. It is not necessary that the ester substituents on the isocyanuric acid be identical, however, preparatively it is generally easier to obtain compounds wherein all the substituents are the same.

To obtain the 4-hydroxybenzyl isocyanurates of this invention an alkali metal cyanate is reacted with a t-alkyl hindered p-hydroxybenzyl halide in an aprotic solvent, such as dimethyl sulfoxide or N,N-dimethylformamide, and at a temperature of about 100 to 130° C. it is essential that the alkali metal cyanate and the 4-hydroxybenzyl halide be employed in equimolar amounts if the tris-(4-hydroxybenzyl)isocyanurate is to be obtained. The mono- and di-substituted isocyanurates can be obtained when excess alkali metal cyanate is employed for the reaction. Other preparative techniques may also be employed to obtain the present compounds, such as for example, the process described in U.S. Pat. 3,075,979.

The novel 4-hydroxybenzyl isocyanurates are high melting (above 200° C.) crystalline solids soluble in acetone, diethyl ether, dioxane, tetrahydrofuran, carbon tetrachloride, chloroform, aromatic hydrocarbons such as benzene, and toluene and slightly soluble in aliphatic hydrocarbons and alcohols such as hexane, methanol and ethanol. They are insoluble in water. The compounds will range in color from white to a very pale yellow when pure, however, if solvent or other impurities are present there can be appreciable color development upon exposure to air.

The present compounds find utility in that they are extremely effective protective agents against the deleterious effects of oxygen, heat and light for a wide variety of organic materials. This efficiency as a stabilizer results at least partially from the ability of the isocyanurate ring to be substituted with up to three hindered phenol groups, thus providing a high molecular weight compound while maintaining a high concentration of the hindered phenol.

Organic materials which are stabilized in accordance with the present invention include both natural and synthetic polymers. The tris-(4-hydroxybenzyl)isocyanurates are useful for the stabilization of cellulosic materials; natural rubber; halogenated rubber; homopolymers of ethylene, propylene, butene-1, isobutylene, pentene-1, hexene-1, 4-methyl-1-pentene and the like or copolymers thereof such as ethylene-propylene copolymer, ethylene-butene-1 copolymer, 4-methyl-1-pentene-hexene-1 copolymer and the like; ethylene-propylene-diene rubbers wherein the diene is 1,4-hexadiene, 2-methyl-1,4-hexadiene, a dimethyl-1,4,9-decatriene, dicyclopentadiene, vinyl cyclohexene, vinyl norbornene, ethylidene norbornene, methylene norbornene, norbornadiene, methyl norbornadiene, methyl tetrahydroindene and the like; conjugated diene polymers as for instance polybutadiene, copolymers of butadiene with styrene, acrylonitrile, acrylic acid, alkyl acrylates or methacrylates, methyl vinyl ketone, vinyl pyridine, etc., polyisoprene, polychloroprene and the like; vinyl polymers such as polyvinyl chloride, polyvinyl fluoride, polyvinylidene chloride, copolymers of vinyl chloride with vinylidene chloride, polyvinyl acetate, copolymers of vinyl halide with butadiene, styrene, vinyl esters, $\alpha,\beta$-unsaturated acids and esters thereof, $\alpha,\beta$-unsaturated ketones and aldehydes, and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylolacrylamide, acrylonitrile, methacrylonitrile and the like; polyether- or polyol-derived polyurethanes; acetal homopolymers and copolymers; polycarbonates; polyesters such as those derived from maleic, fumaric, itaconic or terephthalic anhydrides or the like, for example, polyethylene terephthalate; polyamides such as those derived from the reaction of hexamethylenediamine with adipic or sebacic acid; epoxy resins such as those obtained from the condensation of epichlorohydrin with bisphenols; and the like.

In addition to polymeric materials, the present compounds act to stabilize a wide variety of other organic materials. Such compounds include: waxes, synthetic and petroleum derived lubricating oils and greases; animal oils such as, for example, fat, tallow, lard, cod-liver oil, sperm oil; vegetable oils such as castor, linseed, peanut, palm, cotton seed and the like; fuel oil; diesel oil; gasoline; and the like.

The 4-hydroxybenzyl isocyanurates are especially useful for the stabilization of $\alpha$-monoolefin homopolymers and copolymers. High- and low-density polyethylene, polypropylene, polyisobutylene, poly(4-methyl-1-pentene) have excellent resistance to oxidative attack when stabilized with the compounds of the present invention. Ethylene-propylene copolymers and ethylene-propylene terpolymers generally containing less than about 10% by weight of one or more monomers containing multiple unsaturation also possess excellent stability when stabilized with 4-hydroxybenzyl isocyanurates. Polymer blends, that is, physical admixture of two or more polymers may also be stabilized in accordance with the present invention.

The amount of stabilizer employed will vary with the particular material to be stabilized and also the particular 4-hydroxybenzyl isocyanurate employed. Certain 4-hydroxybenzyl isocyanurates are more useful for certain applications than others. This feature is attributable to the compatibility of the isocyanurate with the organic material to be stabilized due to the difference in alkyl substitution on the phenol ring or the number of phenol groups substituted on the isocyanurate ring, that is, whether the isocyanurate be mono-, di- or tri-substituted. Generally, however, for the effective stabilization of organic materials an amount of the 4-hydroxybenzyl isocyanurate ranges from about 0.001% to about 10% by weight based on the weight of the organic material to be employed. In most applications the amount of the compounds of this invention will vary between about 0.01% and about 5% by weight. With the poly($\alpha$-monoolefin) homopolymers and copolymers about 0.01% to about 1.5% by weight of the stabilizer based on the weight of the olefin polymer will be employed.

The compounds of the present invention are readily incorporated into the organic materials to be stabilized and generally require no special processing techniques. Conventional methods of incorporation have been found adequate. For example, the 4-hydroxybenzyl isocyanurates are readily incorporated into the polymers by mixing on a rubber mill or on a Banbury mixer; or they may be added alone, in a suitable solvent, or masterbatched with other ingredients to a solution or dispersion of the polymer. The ready solubility of the compounds of this invention in a wide variety of organic solvents facilitates their use in solution and also renders them compatible with most oils and lubricants.

The 4-hydroxybenzyl isocyanurates are compatible with conventional compounding ingredients such as, for example, processing oils, plasticizers, lubricants, antisticking agents, fillers, reinforcing agents, sulfur and other curing agents, accelerators, antifoaming agents, rust inhibitors, pourpoint depressants and the like.

They are compatible with other known antioxidants, antiozonants, color stabilizers, heat stabilizers, ultraviolet absorbers and the like. Often when employed in combination with known stabilizers, a synergistic effect will be produced. Synergism will generally result when the p-hydroxybenzyl isocyanurates are combined with peroxide decomposing compounds such as, for example, dithiocarbamates, zinc dialkylthiophosphates or organic sulfides such as those described in U.S. Pat. 2,519,755. Especially effective to produce synergistic activity with the compounds of the present invention are diesters of β-thiodipropionic acid having the formula

ROOCCH₂CH₂—S—CH₂CH₂COOR wherein R is an alkyl group containing from 6 to 20 carbon atoms such as octyl, nonyl, decyl, lauryl, cetyl, stearyl, palmityl, benzyl, cyclohexyl and the like. It has been found advantageous when employing a p-hydroxybenzyl isocyanurate/β-dialkylthiodipropionate stabilizer system, that the β-dialkylthiodipropionate be employed on an equal weight parts basis up to about 5 parts per part of the 4-hydroxybenzyl isocyanurate.

The following examples serve to illustrate the invention more fully. All parts and percentages, unless otherwise indicated are on a weight basis.

EXAMPLE I

A glass reactor equipped with a stirrer, condenser and dropping funnel was charged with 200 ml. of anhydrous N,N-dimethylformamide and 16.2 grams (0.2 mol) anhydrous potassium cyanate suspended therein. The reactor and dropping funnel were maintained under a nitrogen blanket throughout the run. The suspension was heated to 130° C. and 51 grams (0.2 mol) 3,5-di-t-butyl-4-hydroxybenzyl chloride dissolved in 50 ml. dry N,N-dimethylformamide added dropwise over a two hour period. The reaction mixture was heated with stirring for an additional hour, allowed to cool and poured into ice water. The crude reaction product was recovered by filtration. Purification of the tris-(3,5-di-t-butyl-4-hydroxybenzyl)isocyanurate was achieved by multiple extraction of an ether solution of the crude product with 5% aqueous sodium hydrosulfite, water and saturated salt solution. The ether was removed by evaporation and the product recrystallized from methanol and water. 25 grams of the tris-(3,5-di-t-butyl-4-hydroxybenzyl)isocyanurate melting at 213–215° C. was obtained. Infrared analysis showed a single carbonyl peak at 1710 cm.⁻¹ and no nitrogen-hydrogen linkages. Elemental analysis of the product agreed with values calculated for tris-(3,5-di-t-butyl-4-hydroxybenzyl)isocyanurate. Tris-(3,5-di-t-amyl-4-hydroxybenzyl)isocyanurate was prepared following this procedure.

EXAMPLE II

Bis-(3,5-di-t-butyl-4-hydroxybenzyl)isocyanurate was prepared by suspending 121 grams of potassium cyanate (1.5 mol) in 1 liter dry dimethyl sulfoxide containing 10 drops tributyl phosphine. The suspension was heated to 95° C. and 254 grams (1 mol) 3,5-di-t-butyl-4-hydroxybenzyl chloride dissolved in 250 ml. dimethyl sulfoxide added over a three hour period followed by 9 hours additional heating. The reaction mixture was cooled, poured into a large volume of ether and extracted with dilute hydrochloric acid, water and a saturated salt solution. Evaporation of the ether yielded 215 grams of a crude product which recrystallized from ethanol and water and dried had a melting point of 257–258° C. Elemental analysis found 69.99% C., 8.19% H. and 7.44% N. Calculated for bis-(3,5-di-t-butyl-4-hydroxybenzyl)isocyanurate is 70.2% C., 8.33% H. and 7.44% N.

EXAMPLE III

The isocyanuric acid ester substituted with a single 3,5-di-t-butyl-4-hydroxybenzyl group was prepared by charging 20.8 grams 2,6-di-t-butyl phenol (0.1 mol), 10 ml. water and about 200 ml. N,N-dimethylformamide to a reactor, heating to about 40° C. and adding 12.9 grams cyanuric acid (0.1 mol), 3.5 grams para-formaldehyde (0.11 mol) and approximately 1 gram hexamethylenetetramine. The temperature of the reaction mixture was raised to about 112° C. over a period of about 1 hour followed by an additional hour of heating at 112° C. The contents of the reactor were poured into ice water and the solid collected by filtration. The ether-soluble portion of this solid was washed with water, sodium hydrosulfite and sodium chloride solutions before the ether was evaporated. The solid, recrystallized several times from hexane, had a melting point range of 254–258° C. Analysis by nuclear magnetic resonance confirmed the product to be the mono-substituted derivative, 3,5-di-t-butyl-4-hydroxybenzyl isocyanurate.

EXAMPLE IV

A conventional high-density polyethylene was stabilized with varying amounts of tris-(3,5-di-t-butyl-4-hydroxybenzyl)isocyanurate, by itself and in combination with β-dilaurylthiodipropionate. Also, for comparative purposes, several samples were stabilized using known stabilizers which are commonly employed throughout the industry. The recipes employed in these runs are set forth in Table I.

TABLE I

| Sample | 1 | 2 | 3 | 4 | 5 | 6 | 7 | 8 | 9 | 10 | 11 |
|---|---|---|---|---|---|---|---|---|---|---|---|
| High-density polyethylene | 100 | 100 | 100 | 100 | 100 | 100 | 100 | 100 | 100 | 100 | 100 |
| Tris-(3,5-di-t-butyl-4-hydroxy-benzyl) isocyanurate | | 0.5 | 0.05 | 0.1 | 0.1 | 0.2 | 0.3 | | | | |
| β-Dilaurylthiodipropionate | | | 0.2 | | 0.2 | | | 0.2 | | 0.2 | 0.2 |
| 1,1,3-tris-(2-methyl-5-t-butyl-4-hydroxyphenyl)butane | | | | | | | | | 0.1 | 0.1 | |
| 1,3,5-trimethyl-2,4,6-tris-(3,5-di-t-butyl-4-hydroxybenzyl) benzene | | | | | | | | | | | 0.1 |

The additives were incorporated into the polyethylene by dissolving them in acetone, suspending the polyethylene in the solvent and then removing the acetone with a rotary evaporator. The stabilized polyethylene was hot-milled (290–300° F.) for five minutes, sheeted off and placed in a warm 4-cavity ACS mold, shimmed to the desired thickness. The mold was closed and heated at 300° F. for 10 minutes, the last 5 minutes of which 150 tons pressure is applied. The samples are cooled under pressure.

Oxygen absorption data was obtained by pressing the 10 mil molded samples onto aluminum screens which were then placed in a large test tube and aged in pure oxygen at 140° C. in a modified Scott tester block. The induction periods, that is, the time required for autooxidation of the polymer to occur, were recorded and are tabulated in Table II below.

Twenty-five mil molded samples were stapled onto 2″ x 3″ cardboard with a 1″ hole in the center of the card. These cards were mounted in a vertical position on stainless steel racks in an air-circulating oven maintained at 125° C. Every seven days the samples were scanned in the infrared region for carbonyl (1200–2000 cm.⁻¹) build-up. The time at which the first noticeable increase in the carbonyl content was detected was recorded (see Table II). An increase in the carbonyl content is accompanied by embrittling of the polyethylene, in other words, the polyethylene has lost its useful character.

From the data in Table II, it is seen that tris-(3,5-di-t-butyl-4-hydroxybenzyl)isocyanurate is an excellent stabi-

TABLE II

| Sample | 1 | 2 | 3 | 4 | 5 | 6 | 7 | 8 | 9 | 10 | 11 |
|---|---|---|---|---|---|---|---|---|---|---|---|
| Induction time (hours) | 0.5 | 35 | 560 | 58 | 516 | 97 | 152 | 55 | 60 | 225 | 350 |
| Carbonyl development (hours) | 50 | 5,500 | 7,000 | ¹ 7,900 | ¹ 7,900 | ¹ 6,200 | ¹ 6,200 | 2,200 | 2,200 | 3,800 | ¹ 7,500 |

¹ Test terminated at this point with no sample failure.

lizer for high-density polyethylene. The test results also show that the compounds of this invention compare favorably with commercially available hindered phenol stabilizers. A synergistic effect is noted when the tris-(3,5-di-t-butyl-4-hydroxybenzyl)isocyanurate is used in combination with β-dilaurylthiodipropionate. Similar stabilization of polyethylene was achieved with tris-(3,5-di-t-amyl-4-hydroxybenzylisocyanurate.

EXAMPLE V

Tris-(3,5-di-t-butyl-4-hydroxybenzyl)isocyanurate was incorporated in polypropylene in the same manner as described in Example IV. The test samples were prepared by molding the stabilized polymer at 400° F. and 4000 p.s.i. Ten mil samples are heated for 1 minute and 25 mil samples for 2 minutes before transferring to a cold press maintained at 4000 p.s.i. for a 2 minute cooling period. Twenty-five mil samples were aged in an air-circulating oven at 140° C. Samples were deemed to have failed at the first sign of crazing. Table III sets forth the results obtained at several levels of stabilizer.

TABLE III

| Sample | 12 | 13 | 14 | 15 |
|---|---|---|---|---|
| Stabilizer level (parts per hundred parts polypropylene) | 0.1 | 0.25 | 0.5 | 1.0 |
| Hours to crazing | 120 | 192 | 1,320 | [1] 1,400 |

[1] Test terminated at this point with no sample failure.

Unstabilized polypropylene crazed within one hour under these same test conditions.

EXAMPLE VI

A copolymer of 4-methyl-1-pentene and 2–3 weight percent hexene-1 was stabilized with tris-(3,5-di-t-butyl-4-hydroxybenzyl)isocyanurate by itself and in combination with β-dilaurylthiodipropionate. Incorporation of the stabilizer in the polymer, the oxygen absorption and oven aging tests were in accordance with the procedure described in Example IV. Samples were prepared for testing by molding the stabilized copolymer at 270° C. and 10 tons pressure for 15 minutes followed by a cold water quench. Thickness of the samples used in the oven aging was 12 mils instead of the customary 25 mils. Oven aging results obtained at 125° C. for the various stabilized copolymer compositions is set forth in Table IV.

TABLE IV

| Sample | 16 | 17 | 18 | 19 | 20 |
|---|---|---|---|---|---|
| Parts tris-(3,5-di-t-butyl-4-hydroxybenzyl)isocyanurate (per 100 parts copolymer) | 0.1 | 0.1 | 0.5 | | 0.5 |
| Parts β-dilaurylthiodipropionate (per 100 parts copolymer) | | 0.2 | | | 1.0 |
| Induction period (hours) | [1] 0 | 8 | 426 | [2] 24 | [2] 95 |
| Carbonyl development (hours) | 24 | 500 | 2,200 | 5,200 | 10,400 |

[1] Oxygen uptake so rapid at outset that accurate determination not possible.
[2] Determined at 170° C.

EXAMPLE VII

A natural rubber white stock was prepared in accordance with the following recipe:

Ingredient: Parts
Natural rubber _____ 100
Stearic acid _____ 2
Zinc oxide _____ 5
Titanium dioxide _____ 50
Sulfur _____ 2.75
Benzothiazyl disulfide _____ 1
Tetramethylthiuram disulfide _____ 0.1
Tris - (3,5-di-t-butyl-4-hydroxy benzyl)isocyanurate _____ 1

Press cured samples (290° F.) were aged in oxygen bombs maintained at 80° C. for 4 and 7 day intervals. After 4 days aging the tris-(3,5-di-t-butyl-4-hydroxybenzyl)isocyanurate stabilized samples had a tensile strength of 2180 p.s.i. and an elongation of 560% as opposed to 1100 p.s.i. and 540% for an unstabilized sample. After 7 days aging the unstabilized stock had degraded to a sticky mass, whereas the stabilized sample had a tensile strength of 2040 p.s.i. and 520% elongation.

EXAMPLE VIII

A stabilized cis-polyisoprene polymer composition (Ameripol SN 600) was prepared by milling 1.3 grams tris-(3,5-di-t-butyl-4-hydroxybenzyl)isocyanurate into 120 grams of the dry rubber. The unaged rubber had a Mooney viscosity (4 minutes) of 75 which decreased to 17 for the unstabilized rubber after 10 days air aging at 70° C. After the same period of aging, the 4 minute Mooney of the stabilized cis-polyisoprene rubber was 33.

EXAMPLE IX

Polyvinyl chloride (100 parts) containing 0.3 part stearic acid and plasticized with about 30 parts dioctyl phthalate was stabilized with tris-(3,5-di-t-butyl-4-hydroxybenzyl)isocyanurate and aged in a 375° F. air-circulating oven. The stabilized polyvinyl chloride samples showed very little color formation during the first 30–40 minutes as opposed to the unstabilized samples which had become highly colored in this same period.

EXAMPLE X

The unplasticized polyvinyl chloride of Example IX containing no stabilizer evolved 0.1% hydrogen chloride within 12 minutes upon heating at 180° C. Stabilizing with 0.2 part tris - (3,5-di-t-butyl-4-hydroxybenzyl)isocyanurate, increased the time required to achieve the same evolution level to 16 minutes.

EXAMPLE XI

A polymer blend of 75 parts chlorinated polyvinyl chloride having a density of 1.56 and 25 parts of a methyl methacrylate-butadiene-styrene copolymer compounded with 3 parts of a tin stabilizer, 5 parts titanium dioxide and 0.5 part of a lubricant was milled 4 minutes at 390° F. and then aged in a 400° F. forced air oven. Significant color change was noted after about 30–40 minutes and after 50–60 minutes gassing was apparent. When 1 part tris-(3,5-di-t-butyl-4-hydroxybenyl)isocyanurate was employed as additional stabilizer and the sample tested, the first significant color change occurred after 75 minutes and no gas evolution was detected even after 120 minutes aging.

EXAMPLE XII

A general purpose molding-grade acrylonitrile-butadiene-styrene resin was stabilized with 0.5 part tris-(3,5-di-t-butyl-4-hydroxybenzyl)isocyanurate in combination with 1.25 parts tris-(nonylphenyl)phosphite. On oven aging at 160° C., this sample showed less color development after 20 minutes exposure than a comparable sample stabilized with 1.75 parts tris-(nonylphenyl)phosphite.

EXAMPLE XIII 0.5 part tris - (3,5 - di - t - butyl - 4 - hydroxybenzyl)-isocyanurate was added to an elastomeric polyurethane (Estane 5740X140) containing 0.5 part Tinuvin P and 0.5 part Agerite Stalite S. After aging the sample at 100° C. for one week, a 26% decrease in tensile strength and a 16% increase in elongation, compared to the original polymer properties, was observed. This compared favorably with an identical polymer containing 0.5 part of a commercial stabilizer tetra[methylene - 3-(3,5-di-t-butyl-4-hydroxyphenyl)propionate]methane substituted for the tris - (3,5 - di - t - butyl - 4 - hydroxybenzyl)isocyanurate which had a 32% decrease in tensile strength with a 20% increase in elongation after the same exposure to aging. The unstabilized control lost 74% of its tensile properties within the same test period.

EXAMPLE XIV

An ethyl acrylate-acrylonitrile (30%) copolymer latex stabilized with 0.5 part per hundred part rubber tris- (3,5-di-t-butyl-4-hydroxybenzyl)isocyanurate was used to impregnate 11 mil uncoated bleached craft paper by immersing the paper in the latex (15% total solids) for 20 seconds and then drip drying at room temperature. After aging for 7 days in an oven maintained at 138° C. a reflectance reading of 58 was obtained with the stabilized paper. Paper saturated with an unstabilized control latex gave a reflectance reading less than 50 under the same test conditions.

EXAMPLE XV

One hundred parts ethylene-propylene terpolymer comprising 53% ethylene, 43% propylene and 4% ethylidene norbornene was masterbatched with 75 parts FEF black and 25 parts naphthenic oil and compounded as follows:

Ingredients: Parts
- Masterbatch  200
- Zinc oxide  5
- Stearic acid  1.0
- Sulfur  1.5
- Mercaptobenzothiazole  1.5
- Tetramethylthiuram disulfide  0.8
- Dipentamethylene thiuram tetrasulfide  0.8
- Tris - (3,5 - di - t - butyl - 4 - hydroxybenzyl) isocyanurate  1.0

The vulcanizate after air-aging in a test tube at 150° C. for 21 days had retained 98% of its original (unaged) tensile properties.

EXAMPLE XVI

Unstabilized ethylene-propylene-methyl tetrahydroindene (52/44/4) terpolymer samples containing 10 parts per million vanadium catalyst residue (sample 21) and 40 parts per million vanadium catalyst residue (sample 22) became sticky (degraded) after less than 1 day aging at 125° C. When the samples were stabilized with 0.1 part tris - (3,5 - di - t - butyl - 4 - hydroxybenzyl) isocyanurate, the first manifestations of stickiness did not occur until after 16 days for sample 21 and after 4 days for sample 22.

EXAMPLE XVII

A commercial ethylene-propylene - 1,4 - hexadiene terpolymer (Nordel 1040) became sticky after 17 days aging at 125° C., whereas, the same polymer to which 0.2 part tris - (3,5 - di - t - butyl-4-hydroxybenzyl)isocyanurate had been added ran for 60 days before the first signs of stickiness.

EXAMPLE XVIII

To demonstrate the ability of the present compounds to serve as stabilizers against the deleterious effects of ultraviolet light, polypropylene samples containing 0.1 part tris - (3,5 - di - t-butyl-4-hydroxybenzyl)isocyanurate were rotated with constant exposure at 90–100° C. in a Xenon dry-cycle weatherometer. Samples were noted for color development and embrittlement at 100 hour intervals. At 400 hours slight embrittlement was evident in the stabilized samples, however, there was no color development. Unstabilized polypropylene after 50 hours exposure in the weatherometer was completely crazed.

EXAMPLE XIX

Styrene-butadiene copolymer (Ameripol 1511) was stabilized with 0.9 part tris - (3,5 - di - t-butyl-4-hydroxybenzyl)isocyanurate and air-aged at 70° C. The viscosity of the stabilized samples was not appreciably altered after 6 days aging. An unstabilized polymer became hardened, indicating the development of excessive crosslinks, after less than one day aging under identical conditions.

EXAMPLE XX

The following compositions were stabilized with varying amounts of tris - (3,5 - di - t - butyl-4-hydroxbenzyl)-isocyanurate as follows:

| Sample | Material | Parts of stabilizer |
|---|---|---|
| 23 | Polystyrene | 0.5 |
| 24 | Neoprene sponge | 1.0 |
| 25 | Cyclohexene | 0.001 |
| 26 | Mineral oil | 0.1 |
| 27 | Synthetic lubricant (Herculobe A) | 1.5 |

All of the compositions set forth above showed improved oxidative stability over the unstabilized materials.

EXAMPLE XXI

Bis - (3,5 - di - t - butyl - 4 - hydroxybenzyl)isocyanurate as prepared in Example II was employed to stabilize high density polyethylene, both by itself and in combination with β-dilaurylthiodipropionate. The compositions prepared were as follows:

| Sample | 28 | 29 | 30 | 31 |
|---|---|---|---|---|
| Polyethylene | 100 | 100 | 100 | 100 |
| Bis-(3,5-di-t-butyl-4-hydroxybenzyl) isocyanurate | | 0.1 | 0.1 | |
| β-Dilaurylthiodipropionate | | | 0.3 | 0.3 |

The above samples were air aged at 170° C. The control 28 yellowed in approximately one hour whereas the stabilized sample 29 ran for 24 hours before appreciable yellowing and sample 30 had not yellowed even after 100 hours. Sample 31 yellowed after about 48 hours. The same samples were also tested at 140° C. for oxygen absorption. Sample 29 had an induction period of 30 hours and sample 30 had an induction period greater than about 300 hours. For the unstabilized control (28), auto-oxidation set in after less than 5 hours.

The bis - (3,5 - di - t - butyl - 4 - hydroxybenzyl)isocyanurate exhibited a stabilizing effect when tested in other polymeric materials such as polypropylene, ethylene, ethylene-propylene-1,4-hexadiene terpolymer, natural rubber, styrene-butadiene copolymer.

When the above example was repeated using isocyanuric acid ester substituted with a single 3,5-di-t-butyl-4-hydroxybenzyl group, the polyethylene had enhanced stability. The 3,5-di-t-butyl-4-hydroxybenzyl isocyanurate also exhibited a synergistic effect in polyethylene when combined with β-di-laurylthiodipropionate.

EXAMPLE XXII

Tris - (2 - methyl-5-t-butyl-4-hydroxybenzyl)isocyanurate was prepared using the procedure set forth in Example III. 12.9 grams (0.1 mol) cyanuric acid and 24.98 grams (0.3 mol) 36% formaline were charged to a reactor containing about 200 mls. N,N-dimethylformamide, 49.5 grams (0.31 mol) 6-t-butyl-m-cresol and about 1 gram hexamethylenetetraamine. The reactor and its contents were heated under a nitrogen purge to a temperature of about 110° C. and allowed to react for 48 hours. The reaction mixture was allowed to cool, poured into water and the resulting solid collected by filtration. Recrystallization of the crude material from aqueous ethanol gave the tris-(2-methyl-5-di-t-butyl-4-hydroxybenzyl)isocyanurate. The recrystallized material was incorporated in high density polyethylene at varying levels and exerted a stabilizing effect on the polyethylene.

EXAMPLE XXIII

Tris - (3 - methyl-5-t-butyl-4-hydroxybenzyl)isocyanurate was prepared similar to Example XXII. The reactants employed were 12.9 grams (0.1 mol) cyanuric acid, 24.98 grams (0.3 mol) 36% formaline, 61.5 grams (0.373 mol) 6-t-butyl-o-cresol, 1 gram hexamethylenetetraamine in about 200 mls. N,N-dimethylformamide. The reaction was conducted for 24 hours after which time the reaction mixture was cooled and poured into ice water where a brownish green oil was formed. The oil was washed several times with water and then extracted with ether. Removal of the ether under vacuum yielded a yellowish solid, which upon recrystallization from aqueous ethanol, yielded the white solid tris-(3-methyl-5-t-butyl-4-hydroxybenzyl)isocyanurate melting at 148 to 150° C.

High-density polyethylene was stabilized with 0.1 part of the tris - (3-methyl-5-t-butyl-4-hydroxybenzyl)isocyanurate. The stabilized sample had an induction period of 25 hours when aged at 140° C. in oxygen, whereas, the unstabilized control autooxidized in less than 1 hour. When 0.2 part β-dilaurylthiodipropionate was employed in combination with the tris-(3 - methyl-5-t-butyl-4-hydroxybenzyl)isocyanurate, the induction period was increased to about 690 hours. This same stabilized sample lasted for 42 weeks in a forced-air oven maintained at 125° C. before developing significant amounts of carbonyl. Ethylene - propylene - methylene tetrahydroindene terpolymer was also stabilized with the tris-(3-methyl-5-t-butyl-4-hydroxybenzyl)isocyanurate and excellent stabilities achieved.

EXAMPLE XXIV

A mixture of 2,6-di-t-butylphenol and 2-t-butyl-o-cresol were employed in the reaction with cyanuric acid and paraformaldehyde to obtain isocyanuric acid ester having mixed ester substituents. The procedure followed was similar to that described in Example III. 20.6 grams (0.1 mol) 2,6-di-t-butyl-phenol and 32.8 grams (0.2 mol) 2-t-butyl-o-cresol were dissolved in about 200 mls. N,N-dimethylformamide containing about 15 mls. water. To this was charged 12.9 grams (0.1 mol) cyanuric acid, 10.0 grams paraformaldehyde (calculated as 10% excess over 0.3 mol) and about 1 gram hexamethylenetetraamine. The reaction was heated for about 24 hours at a temperature ranging from 108° C. to 115° C. The cooled reaction product was then evaporated to dryness, dissolved in ether and washed successively with water, aqueous sodium hydrosulfite and sodium chloride solutions. The ether was evaporated under vacuum and the solid obtained recrystallized from ethanol. The product had a melting range of 163–170° C.

The product was incorporated in high-density polyethylene and in propylene at levels and the samples aged. Compositions tested, test methods and the test results are reported in Table V.

benzyl)isocyanurate had an induction period of 6.5 hours when aged at 140° C. in an oxygen atmosphere. The same polymer unstabilized immediately took up oxygen at a fast rate upon insertion into the oxygen chamber.

The above examples clearly illustrate the utility of the various 4-hydroxybenzyl isocyanurates of this invention. The ability of these materials to stabilize a wide variety of organic materials, and particularly organic polymeric materials, against the deleterious effects of oxygen, heat and light has been shown. The stabilization of α-monoolefin homopolymers and copolymers particularly polyethylene, polypropylene and ethylene-propylene terpolymers has also been demonstrated. Similar improved stabilities were obtained with cellulosic materials, polyamide (nylon 6), polyethylene terephthalate resin and polytetramethylene terephthalate/isophthalate/sebacate copolyester resins containing 0.5 part or less of the 4-hydroxybenzyl isocyanurates.

The examples above also demonstrate the ability of the present hydroxyphenylalkyleneyl isocyanurates to be combined with other stabilizing materials, such as the β-dialkylthiodipropionates, to achieve synergistic activity.

EXAMPLE XXVII

To further demonstrate the effectiveness of the present compounds to be employed in combination with other known stabilizers, a tris-(3,5-di-t-butyl-4-hydroxybenzyl) isocyanurate/1,1,3-tris-(2-methyl-5-t-butyl - 4 - hydroxyphenyl)butane in polypropylene. 15 mil polypropylene samples were prepared in the conventional manner and aged at 140° C. in a forced-air oven. Table VI sets forth the test results obtained for these stabilizer compositions as well as results obtained for the individual stabilizer components. It is evident that synergism is obtained. Similar synergistic activity was obtained when the hydroxyphenylalkyleneyl isocyanurates were combined with other phenolic stabilizers which are well known to the art such as 2,6 - di - t - butyl-4-methylphenol, tetra[methylene-3-(3,5 - di - t-butyl-4-hydroxyphenyl)propionate]methane, 1,3,5 - trimethyl - 2,4,6 - tris-(3,5-di-t-butyl-4-hydroxybenzyl)benzene, octadecyl - 3 - (3,5-di-t-butyl-4-hydroxyphenyl)propionate and tris - (3,5 - di-t-butyl-4-hydroxy-

TABLE V

| Sample | 32 | 33 | 34 | 35 | 36 | 37 | 38 | 39 | 40 | 41 | 42 |
|---|---|---|---|---|---|---|---|---|---|---|---|
| Polyethylene | 100 | 100 | 100 | | | | | | | | |
| Polypropylene | | | | 100 | 100 | 100 | 100 | 100 | 100 | 100 | 100 |
| Product of Ex. XXIV | 0.05 | 0.1 | 0.1 | 0.1 | 0.25 | 0.5 | 1 | 0.1 | 0.25 | 0.1 | 1 |
| β-Dilaurylthiodipropionate | | | 0.2 | | | | | 0.2 | 0.2 | 1 | 1 |
| 140° C. oxygen aging (induction period-hrs.) | 35 | 56 | 600 | | | | | | | | |
| 125° C. air aging (carbonyl development-hrs.) | | | | 120 | 216 | 1,026 | [1] 7,400 | 1,194 | 1,914 | 3,186 | 3,186 |

[1] Test terminated at this point with no sample failure.

EXAMPLE XXV

An o-hydroxybenzyl ester of isocyanuric acid was obtained by reacting 49.2 grams (0.3 mol) 2-t-butyl-4-methylphenol, 12.9 grams (0.1 mol) cyanuric acid and 9.5 grams (0.3 mol) paraformaldehyde in 250 ml. N,N-dimethylformamide at 115° C. This product (0.1 part) was incorporated in high-density polyethylene which was then aged at 125° C. in a forced-air oven. Carbonyl formation was not detectable by infrared analysis until after 1850 hours, whereas, unstabilized, the carbonyl formation ensues after 50 hours. When 0.25 part of the material was incorporated in polypropylene to be aged at 140° C., a composition having a very pronounced resistance to deterioration (456 hours to crazing) was obtained.

EXAMPLE XXVI

An epichlorohydrin-ethylene oxide copolymer (Hydrin 200) stabilized with 1 part tris-(3,5-di-t-butyl-4-hydroxyphenyl)phosphate, 4,4' - thiobis - (3-methyl-6-t-butylphenol).

TABLE VI

| Sample | 43 | 44 | 45 |
|---|---|---|---|
| Stabilizer components (parts per hundred polymer): | | | |
| Tris-(3,5-di-t-butyl-4-hydroxybenzyl) isocyanurate | 0.25 | | 0.2 |
| 1,1,3-tris-(2-methyl-5-t-butyl-4-hydroxyphenyl)butane | | 0.1 | 0.05 |
| Hours to crazing | 250 | 95 | 850 |

In addition to the compounds wherein isocyanuric acid serves as the nucleus for attaching the hydroxyphenylalkyleneyl groups, other structural related heterocyclic compounds, that is, those having a

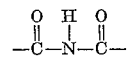

molecular grouping in the ring, may be similarly substituted. Other suitable nuclei include: uric acid, hydantoin, allantoin, parabanic acid, alloxan, uracil, thymine, barbituric acid, phenobarbitone and the like. For example, when 0.075 mol hydantoin, 0.15 mol 3,5-di-t-butyl-4-hydroxybenzyl chloride and 0.15 mol sodium bicarbonate were reacted at 105° C. in N,N-dimethylformamide, the 3,5-di-t-butyl-4-hydroxybenzyl radical was substituted on the hydantoin. This product was effective as a stabilizer, by itself and in combination with β-dilaurylthiodipropionate, for high-density polyethylene. At a 0.1 part level in polyethylene aged in an air-circulating oven maintained at 125° C., no carbonyl developed until after 6½ weeks aging whereas the unstabilized control failed in less than one week.

I claim:

1. Hydroxyphenylalkyleneyl isocyanurate of the formula

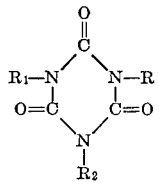

wherein R is a hydroxyphenylalkyleneyl radical having the formula

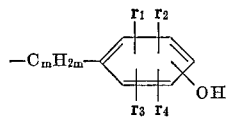

wherein $m$ is an integer from 1 to 4, $r_1$ is an alkyl group positioned immediately adjacent to the hydroxyl group on the ring and containing from 1 to 18 carbon atoms, and $r_2$, $r_3$ and $r_4$ are selected from the group consisting of hydrogen or an alkyl group containing from 1 to 18 carbon atoms; and $R_1$ and $R_2$ are selected from the group consisting of hydrogen or R.

2. A hydroxyphenylalkleneyl isocyanurate compound of claim 1 wherein $r_1$ is a tertiary alkyl group containing from 4 to 12 carbon atoms, $r_2$ is an alkyl group containing from 1 to 12 carbon atoms, $r_3$ and $r_4$ are hydrogen and $m$ is 1.

3. A hydroxyphenylalkyleneyl isocyanurate compound of claim 2, bis-(3-methyl-5-t-butyl-4-hydroxybenzyl)-isocyanurate.

4. A hydroxyphenylalkyleneyl isocyanurate compound of claim 2 wherein $r_1$ and $r_2$ are tertiary alkyl groups containing from 4 to 8 carbon atoms.

5. A hydroxyphenylalkyleneyl isocyanurate compound of claim 4, 3,5-di-t-butyl-4-hydroxybenzyl isocyanurate.

6. A hydroxyphenylalkyleneyl isocyanurate compound of claim 4, bis - (3,5-di-t-butyl-4-hydroxybenzyl)isocyanurate.

7. A hydroxyphenylalkyleneyl isocyanurate compound of claim 4, bis-(3,5-di-t-amyl-4-hydroxybenzyl)isocyanurate.

8. Hydroxyphenylalkylenely isocyanurate compound of claim 1 wherein $R_1$ and $R_2$ are hydroxyphenylalkyleneyl radicals.

9. Hydroxyphenylalkyleneyl isocyanurate compounds of claim 8 wherein $r_1$ is a tertiary alkyl group containing from 4 to 12 carbon atoms, $r_2$ is analkyl group containing from 1 to 12 carbon atoms, $r_3$ and $r_4$ are hydrogen and $m$ is 1.

10. A hydroxyphenylalkyleneyl isocyanurate compound of claim 9, tris-(3-methyl-5-t-butyl-4-hydroxybenzyl)-isocyanurate.

11. A hydroxyphenylalkyleneyl isocyanurate compound of claim 9, tris-(3-t-butyl-5-methyl-2-hydroxybenzyl)-isocyanurate.

12. Hydroxyphenylalkyleneyl isocyanurate compound of claim 9 wherein $r_1$ and $r_2$ are tertiary alkyl groups containing from 4 to 8 carbon atoms.

13. A hydroxyphenylalkyleneyl isocyanurate compound of claim 12, tris-(3,5-di-t-butyl-4-hydroxybenzyl)isocyanurate.

14. A hydroxyphenylalkyleneyl isocyanurate compound of claim 12, tris-(3,5-di-t-amyl-4-hydroxybenzyl)isocyanurate.

References Cited

UNITED STATES PATENTS

| | | | |
|---|---|---|---|
| 2,866,801 | 12/1958 | Himel et al. | 260—248 XR |
| 3,075,979 | 1/1963 | Tazuma et al. | 260—248 |

HENRY R. JILES, Primary Examiner

J. M. FORD, Assistant Examiner

U.S. Cl. X.R.

252—40.1, 300; 260—45.8